United States Patent
Xing

(10) Patent No.: US 12,275,676 B2
(45) Date of Patent: Apr. 15, 2025

(54) IRON CHELATE SUSPENSION CONCENTRATE COMPOSITIONS CONTAINING UREA FORMALDEHYDE

(71) Applicant: Loveland Products, Inc., Loveland, CO (US)

(72) Inventor: Baozhong Xing, Loveland, CO (US)

(73) Assignee: Loveland Products, Inc., Loveland, CO (US)

( * ) Notice: Subject to any disclaimer, the term of this patent is extended or adjusted under 35 U.S.C. 154(b) by 959 days.

(21) Appl. No.: 17/296,485

(22) PCT Filed: Nov. 25, 2019

(86) PCT No.: PCT/US2019/062987
§ 371 (c)(1),
(2) Date: May 24, 2021

(87) PCT Pub. No.: WO2020/112623
PCT Pub. Date: Jun. 4, 2020

(65) Prior Publication Data
US 2022/0024829 A1    Jan. 27, 2022

Related U.S. Application Data

(60) Provisional application No. 62/771,949, filed on Nov. 27, 2018.

(51) Int. Cl.
*C05C 9/02* (2006.01)

(52) U.S. Cl.
CPC ...................................... *C05C 9/02* (2013.01)

(58) Field of Classification Search
CPC ....................................................... C05C 9/02
See application file for complete search history.

(56) References Cited

U.S. PATENT DOCUMENTS

2003/0154754 A1*  8/2003  Costa ........................ C05C 9/02
                                                                  71/28

* cited by examiner

*Primary Examiner* — Wayne A Langel
(74) *Attorney, Agent, or Firm* — FAEGRE DRINKER BIDDLE & REATH; Christa Sindt

(57) ABSTRACT

A suspension concentrate product including from about 10% to about 60% Fe-EDDHSA by weight of the suspension concentrate product, from about 20% to about 90% urea formaldehyde by weight of the suspension concentrate product, and from about 10% to about 40% water.

19 Claims, No Drawings

IRON CHELATE SUSPENSION CONCENTRATE COMPOSITIONS CONTAINING UREA FORMALDEHYDE

CROSS-REFERENCE TO RELATED APPLICATION

This application is a U.S. 371 National Stage application of International Application No. PCT/US2019/062987, filed Nov. 25, 2019, which claims priority to Provisional Application No. 62/771,949, filed Nov. 27, 2018, both of which are herein incorporated by reference in their entireties.

FIELD

The present disclosure relates generally to suspension concentrate compositions comprising an iron chelate and methods of making. More particularly, the present disclosure relates to suspension concentrate compositions comprising iron chelated with 2-[2-[[carboxy-(2-hydroxy-5-sulfophenyl)methyl]amino]ethylamino]-2-(2-hydroxy-5-sulfophenyl)acetic acid (EDDHSA). The present disclosure also relates to a use solution formed by diluting the suspension concentrate with water.

BACKGROUND

Nutrient uptake is an important part of plant growth. Plants deficient in certain types of nutrients can exhibit stunted growth, low yield, and/or poor fruit quality. One particularly important nutrient is iron, which supports chlorophyll production, respiration, and tissue development in the plant. Plants deficient in iron can develop leaf chlorosis (also known as "leaf yellowing"), stunted growth, and/or tissue necrosis.

Some types of soils are naturally lower in certain nutrients that are important for plant development. For example, calcareous soil is characterized as a type of soil having low iron content or, in some instances, having iron in a form not readily absorbable by most plants. Therefore, seeds planted in soils such as these may require additional nutrient supplementation, such as use of fertilizers with supplementary iron to increase iron availability and/or uptake. An example of supplementary iron used in such fertilizers is iron chelate, which can be added to fertilizers to increase plant iron uptake.

Historically, one challenge with iron chelates in concentrate solutions their tendency to react and form precipitate upon mixing with water. These precipitates can cause sticky, lumpy, and/or non-dissolvable particulate, often resulting in a low-stability use mixture that is difficult to use. One solution to this is to reduce the concentration of iron in the use mixture. However, a low weight percentage of iron and/or iron chelates often results in poor effectiveness of the use solution and reduced uptake of iron in the plants. Therefore, there is a desire in the industry for suspension concentrate and/or use solution for treating iron deficiency that includes an effective amount of iron and is also stable in a variety of conditions.

SUMMARY

Example 1 is a suspension concentrate product that includes from about 10% to about 60% Fe-EDDHSA by weight of the suspension concentrate product, from about 20% to about 90% urea formaldehyde by weight of the suspension concentrate product, and the balance water.

Example 2 is the suspension concentrate product of Example 1 that includes from about 30% to about 60% Fe-EDDHSA by weight of the suspension concentrate product.

Example 3 is the suspension concentrate product of Example 1 in which the Fe-EDDHSA includes from about 0.6 wt % to about 5 wt % iron.

Example 4 is the suspension concentrate product of Example 1 in which a ratio of Fe-EDDHSA to urea formaldehyde to water in the suspension concentrate product is about 40 to 60 parts Fe-EDDHSA by weight of the suspension concentrate product, about 20 to 40 parts urea formaldehyde by weight of the suspension concentrate product, and about 10 to 30 parts water by weight of the suspension concentrate product.

Example 5 is the suspension concentrate product of Example 4 in which the ratio of Fe-EDDHSA to urea formaldehyde to water in the suspension concentrate product is about 60:30:10 on a weight basis.

Example 6 is the suspension concentrate product of Example 4 in which the ratio of Fe-EDDHSA to urea formaldehyde to water in the suspension concentrate product is about 60:20:20 on a weight basis.

Example 6 is the suspension concentrate product of Example 4 in which the ratio of Fe-EDDHSA to urea formaldehyde to water in the suspension concentrate product is about 50:20:30 on a weight basis.

Example 7 is the suspension concentrate product of Example 4 in which the ratio of Fe-EDDHSA to urea formaldehyde to water in the suspension concentrate product is about 50:30:20 on a weight basis.

Example 8 is the suspension concentrate product of Example 4 in which the ratio of Fe-EDDHSA to urea formaldehyde to water in the suspension concentrate product is about 50:40:10 on a weight basis.

Example 9 is the suspension concentrate product of Example 1 and which is stable from a temperature of about 2° C. to 50° C. when stored for a period of at least 24 hours.

Example 10 is a use solution that includes about 60% or less Fe-EDDHSA by weight of the use solution, from about 20% to about 90% urea formaldehyde by weight of the use solution, and water.

Example 11 is the use solution of Example 10 that includes about 50% or less Fe-EDDHSA by weight of the use solution.

Example 12 is the use solution of Example 10 that includes from about 10% to about 60% Fe-EDDHSA by weight of the use solution.

Example 13 is the use solution of Example 10 that is stable from a temperature of about 2° C. to 50° C. for at least 5 hours.

DETAILED DESCRIPTION

The present disclosure generally relates to a suspension concentrate containing an iron complex including Fe-EDDHSA, urea formaldehyde, and water. The suspension concentrate can include about 60% or less by weight of the iron complex, from about 20% to about 40% by weight urea formaldehyde, and a balance of water, in combination. A suspension concentrate generally contains a suspension of particles suspended in a fluid such as water. The suspension is stable for a period of time such that the particles do not settle out. The suspension concentrate can be combined with water and optional other components to form a use solution for application to seeds and/or plants.

The iron complex generally includes iron chelated with one or more chelating agents. Chelating agents are small molecules that bind readily to metal ions. One suitable chelating agent includes 2-[2-[[carboxy-(2-hydroxy-5-sulfophenyl)methyl]amino]ethylamino]-2-(2-hydroxy-5-sulfophenyl)acetic acid (EDDHSA), for example. When the chelating agent is bound to iron, the compounds can be referred to as iron chelates (e.g., Fe-EDDHSA). Iron chelates can be used to maintain iron availability in soil as well as improve iron uptake in plants and seeds.

The suspension concentrate has a high concentration of iron. For example, the suspension concentrate can contain 3% or more of iron by weight. In some embodiments, the suspension concentrate contains 3% to 5% iron by weight.

The suspension concentrate includes 60% or less by weight of the iron complex (e.g., Fe-EDDHSA). For example, in some embodiments, the suspension concentrate can include from about 10% to 60% Fe-EDDHSA by weight of the suspension concentrate, from about 20% to 60% Fe-EDDHSA by weight of the suspension concentrate, or from about 30% to 60% Fe-EDDHSA by weight of the suspension concentrate.

The suspension concentrate also includes urea formaldehyde. In some embodiments, the suspension concentrate can include from about 20% to 90% urea formaldehyde by weight of the suspension concentrate. In some embodiments, the suspension concentrate can include from about 20% to 40% urea formaldehyde by weight of the suspension concentrate or from about 20% to 30% urea formaldehyde by weight of the suspension concentrate. For example, in various embodiments, the suspension concentrate may contain about 20%, 25%, 30%, 35%, or 40% urea formaldehyde by weight of the suspension concentrate.

The suspension concentrate also includes a balance of water. For example, in various embodiments, the suspension concentrate can include from about 10% to 30% water by weight of the suspension concentrate, from about 10% to 25% water by weight of the suspension concentrate or from about 10% to 15% water by weight of the suspension concentrate.

In some embodiments, the suspension concentrate may be formulated according to one of the example formulations provided in Table 1 in which each component is provided in weight percent by weight of the suspension concentrate.

TABLE 1

|  | Example Formulation 1 | Example Formulation 2 | Example Formulation 3 |
| --- | --- | --- | --- |
| Fe-EDDHSA | 10%-60% | 20%-60% | 30%-60% |
| Urea formaldehyde | 20%-90% | 20%-40% | 20%-30% |
| Water | Balance | Balance | Balance |

In some embodiments, a ratio of the Fe-EDDHSA to urea formaldehyde to water in the suspension concentrate is about 30 to 60 parts Fe-EDDHSA by weight of the suspension concentrate, about 20 to 40 parts urea formaldehyde by weight of the suspension concentrate, and about 10 to 30 parts water by weight of the suspension concentrate. In one example, the suspension concentrate can include about 60% Fe-EDDHSA by weight of the suspension concentrate, about 30% urea formaldehyde by weight of the suspension concentrate, and about 10% water by weight of the suspension concentrate, and/or other optional additives or inevitable impurities. In other terms, a ratio of Fe-EDDHSA to urea formaldehyde to water is about 60:30:10. In another example, the suspension concentrate includes about 60% Fe-EDDHSA by weight of the suspension concentrate, about 20% urea formaldehyde by weight of the suspension concentrate, and about 20% water by weight of the suspension concentrate, and/or other optional additives or inevitable impurities. In other terms, the ratio of Fe-EDDHSA to urea formaldehyde to water is about 60:20:20. In another example, the suspension concentrate includes about 50% iron complex by weight of the suspension concentrate, about 40% urea formaldehyde by weight of the suspension concentrate, and about 10% water by weight of the suspension concentrate, and/or other optional additives or inevitable impurities. In other terms, the ratio of Fe-EDDHSA to urea formaldehyde to water is about 50:40:10. In another example, the suspension concentrate includes about 50% Fe-EDDHSA by weight of the suspension concentrate, about 30% urea formaldehyde by weight of the suspension concentrate, and about 20% water by weight of the suspension concentrate, and/or other optional additives or inevitable impurities. In other terms, the ratio of Fe-EDDHSA to urea formaldehyde to water is about 50:30:20. In another example, the suspension concentrate includes about 50% Fe-EDDHSA by weight of the suspension concentrate, about 20% urea formaldehyde by weight of the suspension concentrate, and about 30% water by weight of the suspension concentrate, and/or other optional additives or inevitable impurities.

In some embodiments, the suspension concentrate may include one or more optional additives and/or inevitable impurities. Examples of optional additives can include crystallization modifiers, corrosion inhibitors, salts, surfactants, antifoam agents and other chemicals.

Suspension concentrates enable storing smaller volumes of material as compared to storage of a diluted use solution. In some instances, suspension concentrates may be stored for long periods of time and at a variety of temperatures. For example, the suspension concentrate may be stored throughout the harvest season or during winter months. In some embodiments, the suspension concentrate is stable at near freezing temperatures and at temperatures well above ambient temperature (i.e., at temperatures greater than 20° C., greater than 30° C., greater than 40° C., or as high as 50° C.). In some embodiments, the suspension concentrate is stable between 2° C. and 50° C. when stored for a period of at least 24 hours. In some embodiments, particles within the suspension concentrate are uniformly distributed at temperatures between about 10° C. and 50° C. At temperatures below 10° C., the product may experience slight settling, which can be mixed back into the product by stirring or shaking.

The iron in a composition can react with other components of the solution, which can cause the solution to decompose, gel, solidify, or form precipitate or deposits that are difficult to redissolve. A stable solution refers to a solution that does not readily decompose over time and/or does not readily form precipitates or substantially thicken at low temperatures. In some instances, a stable solution may partially crystallize, but any crystals that do form readily redissolve into solution. For example, the crystals can redissolve when the suspension concentrate is mixed with water, or when the temperature of the solution is increased.

The suspension concentrate can be formed by mixing the above-mentioned components together to form a stable suspended concentrate product. In some examples, the iron complex is mixed with a suitable amount of water and/or other desired additives and continuously mixed until a uniform, suspended concentrate forms. Preparation of the suspension concentrate is described in further detail in the example section.

Use Solution

A use solution, as discussed herein, refers to a solution or suspension concentrate that has been diluted with water and/or other components to form a solution having a suitable concentration of ingredients to be applied to plants or seeds. In some examples, the use solution includes the suspension concentrate, a fertilizer, and water. Suitable fertilizers include starter fertilizers, which refers to a fertilizer that is applied to meet nutrient demands of a seed before the plant's root system develops. One example of a suitable starter fertilizer is Levitate™ starter fertilizer available from Loveland Products, Inc.

In some examples, the use solution includes from about 1% to about 5% suspension concentrate by weight of the use solution, from about 1% to about 4% suspension concentrate by weight of the use solution, or from about 2% to about 4% suspension concentrate by weight of the use solution.

In some examples, the use solution includes from about 3% to about 30% phosphate by weight of the use solution, from about 5% to 25% phosphate by weight of the use solution, or from about 10% to 20% phosphate by weight of the use solution. Phosphate has low compatibility with iron and use solutions containing both components may have a stability of less than 30 minutes. That is, in previous use solutions, the compatibility of phosphate and iron resulted in decomposition, gelling, solidification or formation precipitates or deposits within 30 minutes of preparing the use solution. In some embodiments of the current disclosure, a use solution containing phosphate and iron is stable for at least two hours. This enables the use solution to be applied as a uniform solution (i.e., without differences in constituent concentrations due to settling or separation.)

In some examples, the use solution includes a balance of water and/or other optional additives and inevitable impurities. The concentration of ingredients in the use solution can vary depending on the desired end use. In some examples, a ratio of the suspended concentrate-to-fertilizer-to-water may be about 7 to 13 to 20. However, other ratios are contemplated depending on the desired concentration of the use solution. The pH of the use solution can also vary depending on the desired end use or the average pH of the soil. In some examples, the pH of the use solution is from about 6 to 8, from about 6.5 to about 8, or from about 6.5 to about 7.5.

The use solution can be formed by mixing the components in a tank (i.e., tank mix) followed by application to the field or crop. In some examples, the use solution or tank mix is stable for at least 1 hours, at least 2 hours or at least 3 hours. In some embodiments, the use solution is stable for up to about 3 hours, up to 4 hours or up to 5 hours.

The use solution may be used in-furrow applications and foliar applications. For example, the use solution may be applied in-furrow for soybeans.

The present invention is more particularly described in the following examples that are intended as illustrations only, since numerous modifications and variations within the scope of the present invention will be apparent to those of skill in the art. Unless otherwise noted, all parts, percentages, and ratios in the following examples are on a weight basis.

EXAMPLES

Samples 1-5

Suspension concentrate solutions were formed by combining Fe-EDDHSA, urea formaldehyde, and water in the weight amount (grams) shown in Table 2. The samples were stored at 2° C., room temperature (approximately 20° C. to 22° C.), and 50° C. for one month.

TABLE 2

| Sample | Fe % | Total (g) | Fe-EDDHSA (g) | Urea Formaldehyde (g) | Water (g) |
| --- | --- | --- | --- | --- | --- |
| 1 | 3.00 | 100.00 | 50 | 50 | 0 |
| 2 | 3.00 | 100.00 | 50 | 40 | 10 |
| 3 | 3.00 | 100.00 | 50 | 30 | 20 |
| 4 | 3.00 | 100.00 | 50 | 20 | 30 |
| 5 | 3.00 | 100.00 | 50 | 10 | 40 |

Observations after the storage period are provided in Table 3. The stability results were acceptable. No differences were seen in the samples stored at room temperature and at 2° C.

TABLE 3

| Sample | At 2° C. | At Room Temp. | At 50° C. |
| --- | --- | --- | --- |
| 1 | Uniform solution/ suspension concentrate, thick | Uniform solution/ suspension concentrate | Uniform solution/ suspension concentrate, soft and flowable |
| 2 | Uniform solution/ suspension concentrate, thick | Uniform solution/ suspension concentrate | Uniform solution/ suspension concentrate, flowable |
| 3 | Uniform solution/ suspension concentrate, crystals floating on top | Uniform solution/ suspension concentrate | Uniform solution/ suspension concentrate, flowable |
| 4 | Uniform solution/ suspension concentrate | Uniform solution/ suspension concentrate | Uniform solution/ suspension concentrate, flowable, thinner on top and thicker at bottom |
| 5 | Uniform solution/ suspension concentrate | Uniform solution/ suspension concentrate | Uniform solution/ suspension concentrate, soft cake at bottom |

Samples 6-10

Suspension concentrate solutions were formed by combining Fe-EDDHSA, urea formaldehyde, and water in the weight amount (grams) shown in Table 4. The samples were stored at 2° C., room temperature, and 50° C. for one month.

TABLE 4

| Sample | Fe % | Total (g) | Fe-EDDHSA (g) | Urea Formaldehyde (g) | Water (g) |
| --- | --- | --- | --- | --- | --- |
| 6 | 3.60 | 100.00 | 60 | 40 | 0 |
| 7 | 3.60 | 100.00 | 60 | 30 | 10 |
| 8 | 3.60 | 100.00 | 60 | 20 | 20 |
| 9 | 3.60 | 100.00 | 60 | 10 | 30 |
| 10 | 3.60 | 100.00 | 60 | 0 | 40 |

Observations after the storage period are provided in Table 5. The stability results were acceptable. No differences were seen between the samples stored at

TABLE 5

| Sample | At 2° C. | At Room Temp. | At 50° C. |
|---|---|---|---|
| 6 | Uniform solution/suspension concentrate | Uniform solution/suspension concentrate | Uniform solution/suspension concentrate |
| 7 | Uniform solution/suspension concentrate | Uniform solution/suspension concentrate | Uniform solution/suspension concentrate |
| 8 | Uniform solution/suspension concentrate | Uniform solution/suspension concentrate | Uniform solution/suspension concentrate |
| 9 | Uniform solution/suspension concentrate | Uniform solution/suspension concentrate | Uniform solution/suspension concentrate |
| 10 | Uniform solution/suspension concentrate | Uniform solution/suspension concentrate | Uniform solution/suspension concentrate |

What is claimed is:

1. A suspension concentrate product, comprising:
from about 10% to about 60% Fe-EDDHSA by weight of the suspension concentrate product;
from about 20% to about 90% urea formaldehyde by weight of the suspension concentrate product; and
from about 10% to about 40% water.

2. The suspension concentrate product of claim 1, wherein a ratio of Fe-EDDHSA to urea formaldehyde to water in the suspension concentrate product is from about 40 to 60 parts Fe-EDDHSA by weight of the suspension concentrate product to from about 20 to 40 parts urea formaldehyde by weight of the suspension concentrate product to from about 10 to 30 parts water by weight of the suspension concentrate product.

3. The suspension concentrate product of claim 2, wherein the ratio of Fe-EDDHSA to urea formaldehyde to water in the suspension concentrate product is about 60:30:10 on a weight basis.

4. The suspension concentrate product of claim 2, wherein a ratio of Fe-EDDHSA to urea formaldehyde to water in the suspension concentrate product is about 60:20:20 on a weight basis.

5. The suspension concentrate product of claim 2, wherein a ratio of Fe-EDDHSA to urea formaldehyde to water in the suspension concentrate product is about 50:20:30 on a weight basis.

6. The suspension concentrate product of claim 2, wherein a ratio of Fe-EDDHSA to urea formaldehyde to water in the suspension concentrate product is about 50:30:20 on a weight basis.

7. The suspension concentrate product of claim 2, wherein a ratio of Fe-EDDHSA to urea formaldehyde to water in the suspension concentrate product is about 50:40:10 on a weight basis.

8. The suspension concentrate product of claim 1, wherein the suspension concentrate product includes from about 30% to about 60% Fe-EDDHSA by weight of the suspension concentrate product.

9. The suspension concentrate product of claim 1, wherein the Fe-EDDHSA comprises from about 0.6 wt % to about 5 wt % iron.

10. The suspension concentrate product of claim 1, wherein the suspension concentrate product is stable from a temperature of about 2° C. to 50° C. when stored for a period of at least 24 hours.

11. The suspension concentrate product of claim 1, wherein the suspension concentrate product comprises Fe-EDDHSA, urea formaldehyde and the balance is water.

12. A method of forming a use solution, the method comprising:
mixing the suspension concentrate product of claim 1 with water to form a use solution, the use solution including from about 1% to about 5% suspension concentrate product by weight of the use solution.

13. The method of claim 12, the method further comprising:
mixing fertilizer with the suspension concentrate and water to form the use solution.

14. The method of claim 13 wherein the use solution includes from about 3% to about 30% phosphate by weight of the use solution.

15. A use solution comprising:
greater than zero and 60% or less Fe-EDDHSA by weight of the use solution;
from about 20% to about 40% urea formaldehyde by weight of the use solution; and
water.

16. The use solution of claim 15, wherein the use solution includes about 50% or less Fe-EDDHSA by weight of the use solution.

17. The use solution of claim 15, wherein the use solution includes from about 10% to about 60% Fe-EDDHSA by weight of the use solution.

18. The use solution of claim 15, wherein the use solution is stable from a temperature of about 2° C. to 50° C. for at least 5 hours.

19. The use solution of claim 15 and further comprising from about 3% to about 30% phosphate by weight of the use solution.

* * * * *